United States Patent [19]

Ogasaware et al.

[11] 3,808,896

[45] May 7, 1974

[54] PRESET DEVICE OF UHF TUNER

[75] Inventors: Shoji Ogasaware; Teruzo Tamate, both of Tokyo, Japan

[73] Assignee: Alps Electric Co., Ltd., Tokyo, Japan

[22] Filed: Sept. 1, 1971

[21] Appl. No.: 177,080

[30] Foreign Application Priority Data

Sept. 7, 1970 Japan .............................. 45-78629

Sept. 8, 1970 Japan .............................. 45-89713

[52] U.S. Cl. .............................. 74/10.6, 74/10.85

[51] Int. Cl. .............................. F16h 35/18, H03j 1/06

[58] Field of Search .......... 74/10.6, 424.8, 441, 569

[56] References Cited

UNITED STATES PATENTS

| | | | |
|---|---|---|---|
| 2,252,796 | 8/1941 | Whittell | 74/441 |
| 2,558,679 | 6/1951 | Gressel et al. | 74/569 X |
| 2,560,100 | 7/1951 | Ginsberg | 74/569 X |
| 3,555,914 | 1/1971 | Mase | 74/10.6 |

*Primary Examiner*—Allan D. Herrmann
*Attorney, Agent, or Firm*—Eliot S. Gerber

[57] ABSTRACT

A preset device of a UHF tuner having a plurality of fine adjusting screws mounted on a fine adjusting shaft at the outer periphery of a rotary drum mounted on a channel switching main shaft to be turned selectively in communication with the adjusting shaft in operation, has a plurality of memory slugs screwed to the fine adjusting screws and movable in axial direction along fine adjusting shaft upon the rotation of the fine adjusting screws. A slider disposed on the moving surface of the memory slugs moves fine adjusting elements such as variable condensers when moved by the memory slugs cammed to the fine adjusting position by the operation of the channel switching main shaft. The slider comprises two angular cams facing at their respective top centers a memory slug fixed therebetween and inserted into a slit formed on the slider to control its disposition for moving the slider in contact with the memory slugs.

2 Claims, 10 Drawing Figures

INVENTOR

BY

ATTORNEY

INVENTOR

BY

ATTORNEY

PRESET DEVICE OF UHF TUNER

BACKGROUND OF THE INVENTION

1. Field of the Invention

This invention relates to a preset device of a UHF tuner.

2. Description of the Prior Art

The conventional preset device of a UHF tuner has been a structure wherein a fine adjusting screw is directly moved with respect to a rotary drum but since it must have a long fine adjusting screw surface in order to enhance the fine adjusting function, it introduces a disadvantage that the overall exterior size is large.

SUMMARY OF THE INVENTION

The conventional prior art preset device of a UHF tuner of the memory slug type, is shown in FIG. 1, in which the memory slug 5′ is moved by a fine adjusting screw 4′ so that this movement of the memory slug 5′ is introduced to a slider 16′ so as to move a fine adjusting element such as variable condenser, etc. However, in such a structure shown in FIG. 1, when the rotary drum (not shown) is rotated with respect to the slider 16′ so that the channel is switched, two memory slugs 5′ disposed laterally are sometimes disposed laterally to the right and left of the center of an angular cam 17′ (see two dotted broken lines in FIG. 1) on the way of rotation of the rotary drum, and if such state takes place, a nodal effect takes place at two memory slugs 5′ and angular cam 17′ with the result the operator mistakes that state for the normal operation with the memory slug 5′ at the center of the angular cam 17′.

Further, the tuner shown in FIG. 1 has the structure that a tension spring 24′ is wound onto the pinion shaft 25′ so that the base end thereof is engaged with the frame side in order that the backlash taking place between the rack 22′ of the slider 16′ and the pinion 21′ of the fine adjusting element is removed, and that the angular cam 17′ of the slider 16′ is urged toward the memory slug 5′, but the pressure of the slider on the memory slug by the tension spring 24′ disturbs the smooth operation with the result that it is difficult to design a proper strength tension spring.

In addition, in such conventional preset device, it is necessary to eliminate the backlash so as to correctly engage the fine adjusting screw with the memory slug enabling the preset to memorize the tuning point locally, and if this is neglected, when the channel is switched, the tuning point of the receiving frequency, preset previously is displaced to destroy the preset function.

Such backlash, which is a great detriment, is restrained by enhancing the mechanical accuracy of the memory slug and fine adjusting screw by lightly engaging the memory slug with the fine adjusting screw, but such a mechanism is expensive and wear causes lowering of accuracy as time passes.

It is, therefore, an object of this invention to provide a preset device of a UHF tuner which has a reasonable mechanism, operates smoothly, has superior durability has, superior fine adjusting function and reproductivity of the preset, is simple in structure and is easy to manufacture and less expensive.

It is another object of this invention to provide a memory slug mechanism of a preset device of a UHF tuner which eliminates the backlash and has superior preset function.

According to one aspect to this invention, there is provided a preset device of a UHF tuner having a plurality of fine adjusting screws mounted on a fine adjusting shaft at the outer periphery of a rotary drum mounted on a channel switching main shaft. A plurality of memory slugs are screwed to the fine adjusting screws and movable in the axial direction parallel to the fine adjusting shaft upon the rotation of the fine adjusting screws, and a slider is disposed on the movement surface of the memory slugs for moving fine adjusting elements such as variable condensers when moved by the memory slugs cammed to the fine adjusting position by the operation of the channel switching main shaft, which comprises two angular cams facing at the respective centers thereof, a memory slug fixed therebetween and inserted into a slit formed on the slider to control its disposition for moving the slider in contact with the memory slugs.

According to another aspect of this invention, there is provided a memory slug mechanism of the preset form of UHF tuner having a plurality of fine adjusting screws mounted on a fine adjusting shaft at the outer periphery of a rotary drum. The drum is mounted on a channel switching main shaft which is turned selectively in communication with the adjusting shaft. A set of memory slugs for moving a slider are screwed onto the fine adjusting screws, wherein the engaging portions of the memory slugs are divided by split grooves to give a resiliency to the engaging portions and are engaged with the fine adjusting screws.

BRIEF DESCRIPTION OF THE DRAWINGS

The other objects, features and advantages of this invention will become apparent from the following description taken in conjunction with the accompanying drawings, in which.

DESCRIPTION OF THE PREFERRED EMBODIMENTS

Reference is now made to the drawings, particularly to FIGS. 2 to 10, which show one embodiment of this invention.

Figure 9:
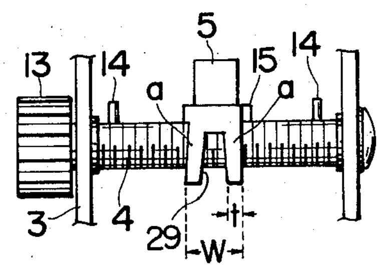
FIG. 9 is a side view of the state in FIG. 8.

Reference numeral 1 illustrates a channel switching main shaft, 2 a fine adjusting shaft movably engaged rotatably to the channel switching main shaft 1, 3 a rotary drum fixed to the channel switching main shaft 1 and to which a predetermined number (8) of fine adjusting screws 4 (specialized for the respective channels around the outer periphery thereof) are mounted to the channel switching main shaft 1 in axial direction so as to correspond to the axial direction. 5 shows a memory slug inserted into a guide groove 6 (see FIG. 4) formed on the peripheral surface of the rotary drum 3 to be screwed on the fine adjusting screw 4. As shown in FIG. 9, the engaging portions *a*, a of the memory slug 5 are split to the right and left at a split groove 29 to be broadened outwardly and to be screwed on the fine adjusting screw 4 in such a manner that the backlash produced between the fine adjusting screw 4 and the memory slug is completely eliminated by the elastic force W of the engaging portions *a,a*. In the drawings, the engaging portions *a, a* are broadened outwardly, but it may be effected the same even if the engaging portions *a, a* are made narrow inwardly to be screwed on the fine adjusting screw 4. Though the thickness *t* of the engaging portions *a,a* in the drawings are the same, it may also be constructed in such a manner that they are differentiated so that one is thick while the other is thin and the thick one is main while the thin one is slave so that the backlash may be eliminated only by the elastic force of the thin engaging portion.

Numeral 7 shows a sliding plate movable laterally against the elastic force of the return spring 9 (see FIG. 10) by the depressing force of the fine adjusting shaft 2 in contact with the circular truncated conical portion 8 of the fine adjusting shaft 2. An intermediate gear 10 is meshed with the gear 11 of the fine adjusting shaft 2 upon movement with the sliding plate 7 by the depressing prssure of the fine adjusting shaft 2 mounted onto the sliding plate 7. A clutch gear 12 is directly connected to the intermediate gear 10 and so rotated that when the intermediate gear 10 is meshed with the gear of the fine adjusting shaft 2 it meshes with the gear 13 of the fine adjusting screw 4 so as to transmit the rotation of the fine adjusting shaft 2 to the fine adjusting screw 4.

Figure 5:
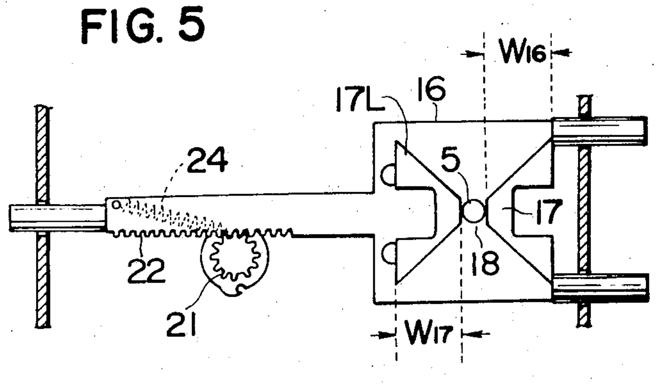
FIG. 5 is an inner view of a slider.
Figure 8:
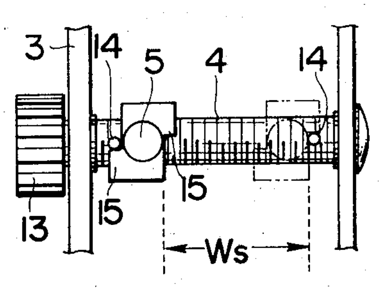
FIG. 8 is a plan view showing the mounting state of memory slug.
Figure 6:
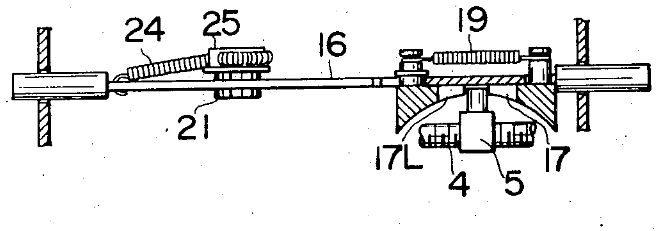
FIG. 6 is a side view of the slider.
Figure 7:
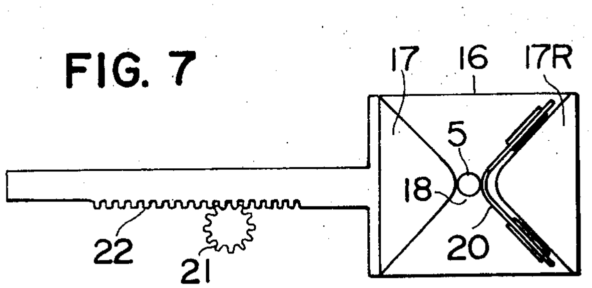
FIG. 7 is an inner view of another embodiment of the slider.
Figure 10:
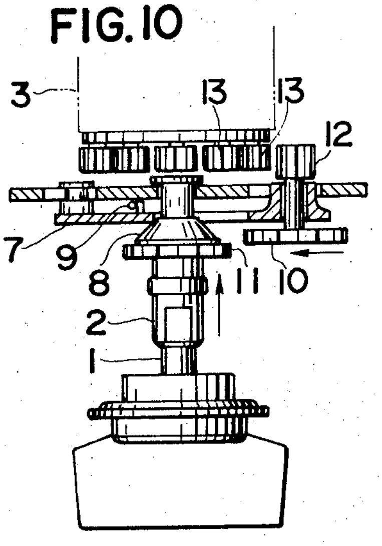
FIG. 10 is a sectional view showing the relationship between the fine adjusting shaft and sliding plate.

Numeral 14 is a stopper pin for stopping the engaging portion 15 of the memory slug 3 moved by the rotation of the fine adjusting screw 4 so as to stop the memory slug 5, and thus it avoids the memory slug 5 closely contacting its side surface with the side inner surface of the rotary drum 3 so as to make the returning movement of the memory slug 5 taken place by the reverse rotation of the fine adjusting screw 4 smooth (see FIG. 9). 16 is a slider which rotates with the rotary drum 3 by the operation of the channel switching main shaft 1 to be moved by the memory slug 5 to a predetermined location, and which has the width W17 (see FIG. 5) near the width W5 (see FIG. 8) of the movement of the memory slug 5 so that two angular cams 17 contacting with the memory slug 5 face at their tops or centers to be mounted in the space of the slit 18 through which the memory slug 5 may pass. The control of the disposition of the slider 16 is conducted by the memory slug 5 inserted into the slit 18, but if the slit 18 is slightly larger than the memory slug 5 to form a gap, the correct control of the disposition of the slider 16 cannot be done with the result that the function of the preset is destroyed, and accordingly this is prevented by the following means:

FIGS. 5, 6 and 7 show the example of the above case, and FIG. 5 shows the case where one angular cam 17L is constructed movably to be drawn by the spring 19 to make the slit 18. FIG. 7 shows the case where a leaf spring 20 is mounted to one angular cam 17R by bending it in angular shape in structure, either of them eliminate the gap.

Figures 1, 2, 3, 4:
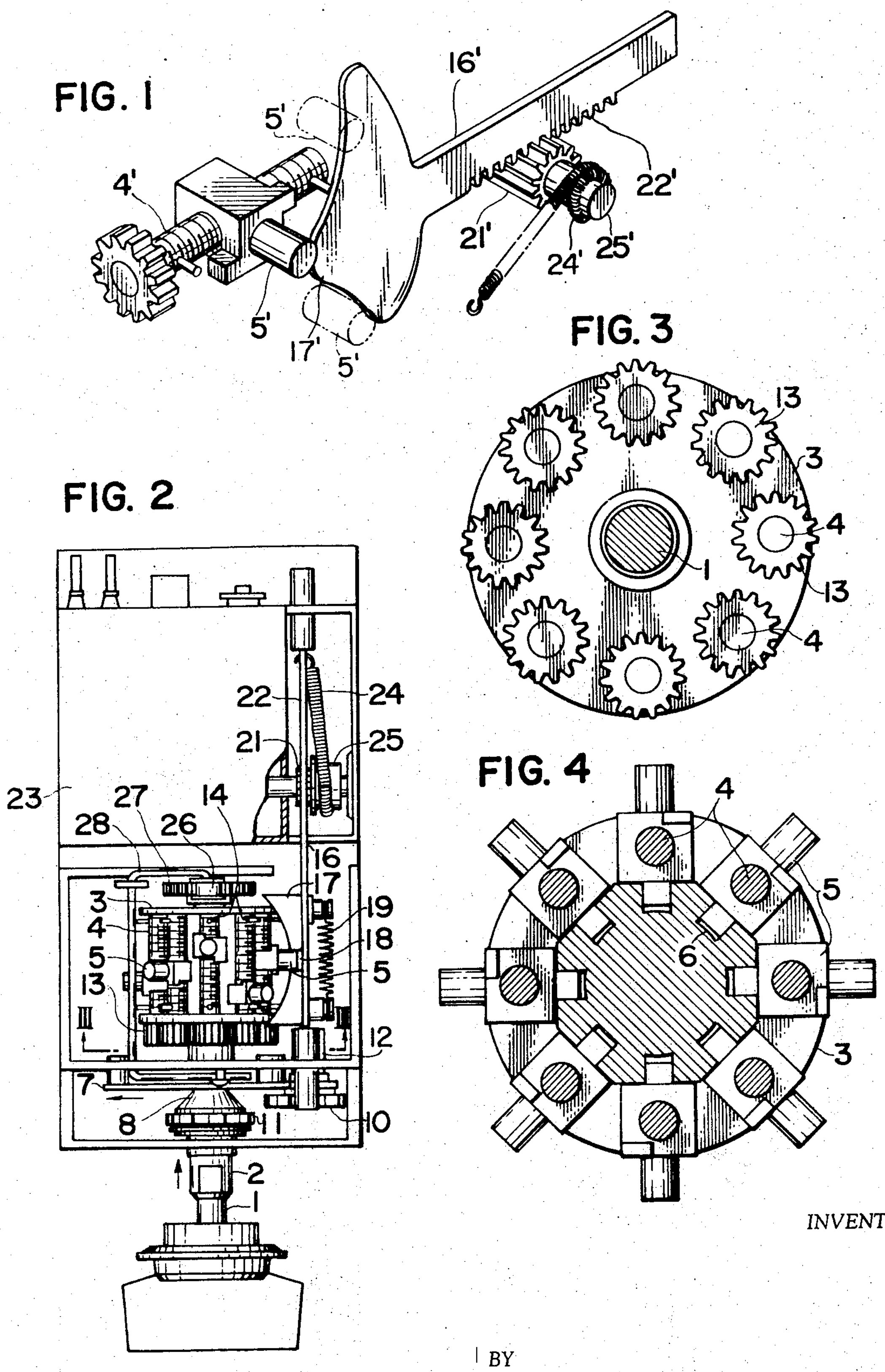
FIG. 1 is a perspective view of the reference showing the relationship between the memory slug and the slider of the prior art.
FIG. 2 is a plan view of one embodiment of a preset device of a UHF tuner according to this invention.
FIG. 3 is a sectional view of the tuner of FIG. 2 taken along the line X—X.
FIG. 4 is a sectional view showing the mounting state of fine adjusting screw with respect to a rotary drum.

Numeral 21 illustrates a pinion for moving the fine adjusting elements 23 (see FIG. 2) such as variable condensers by rotating upon movement of the slider 16 in engagement of the slider 16 with the rack 22. A tension spring 24 is engaged at one end with the pinion shaft 25, and engaged at the other end with the slider so as to prevent backlash from taking place between the pinion 21 and the rack 22 in such a manner that the force of the tension spring 24 does not vary greatly by the rotation of the pinion shaft 25 different from the case that as shown in FIG. 1. The tension spring 24' is so used as to engage at one end, the wound pinion shaft 25' and to engage at the other end with the frame, but in improvement it always prevents the backlash with a constant force. A nodal mechanism 26 acts together with the cam plate 27 and is inserted into the cutout portion of the cam plate 27 so as to dispose one memory slug 5 to the slit 18 of the annular cams 17, 17 of the slider 16 to fix the rotary drum 3 as a stopper, 28 is a supporting spring for supporting the stopper 26. In FIG. 9, a cut groove 29 opens the engaging portions of the memory slug 5 and is cut on the engaging portions of the memory slug to the right and left (or closing) so as to prevent the backlash taking place between the fine adjusting screw 4 and the memory slug 5 by the elastic force taking place thereby.

The operation of the thus constructed preset device of this invention will now be described.

When the channel switching main shaft 1 is operated so as to push the fine adjusting shaft 2 and rotate it, the clutch gear 12 is meshed with the gear 13 so as to move the memory slug 5, and accordingly the slider 16 is cammed until slug 5 is within the slit 18 of the angular cams 17, 17 thereby to finely adjust the variable condenser 23. When the channel switching main shaft 1 is rotated to be switched to the other channel, the memory slug 5 related to the channel acts on the angular cams 17, 17 on the way to a predetermined location so as to move it to be fixed to the adjusting position resulting in sufficient preset.

It should be understood from the foregoing description that since the preset device of this invention does not adopt the direct means for finely adjusting the fine adjusting screw with respect to the rotary drum in movement known per se, but has the memory slug structure, it may readily be formed compact.

It is also understood that since the preset device of this invention has finely adjustable angular cams different from the one in FIG. 1, there takes place no nodal effect for misleading the operator between the two memory slugs and the angular cam so that it operates smoothly.

It should also be understood that since the memory slug mechanism of this invention is so constructed in the preset device of the UHF tuner shown, that the fine adjusting shaft is depressed to be connected to the fine adjusting screw to move the memory slug of the channel selected by the rotation of the channel switching main shaft 1 in advance by the rotating operation of the fine adjusting shaft 2, but an elastic force is given to the engaging portions of the split groove of the memory slug to completely eliminate the backlash by such elastic force to always hold the correct disposition consequently the memory of the tuning point or preset function is superior.

It should also be understood that since the elastic force of the engaging portions of the preset device of this invention absorb the severe repeating usage with wear of the fine adjusting screw and memory slug, it is durable for long usage and is also proper for mass production and less expensive production.

What is claimed is:

1. A preset device for a tuner including a base, a channel switching main shaft rotatably mounted on said base, a rotatably mounted fine adjusting shaft, a rotary drum mounted on said main shaft, a plurality of fine adjusting screws rotatably mounted at the outer periphery of said drum, means to selectively couple said fine adjusting shaft and selectively one of said fine adjusting screws, a plurality of memory slugs each screwed respectively to one of the fine adjusting screws and movable in an axial direction parallel to the axis of the fine adjusting shaft upon the rotation of its fine adjusting screw, a slider movably mounted on said base and cammed by the moving surface of selectively one of said memory slugs, a fine adjusting element including a shaft carrying a pinion which is in operable connection with said slider and moved when the memory slug cams the slider by the operation of the channel switching main shaft, the improvement of the slider comprising two angular cam face portions on said slider, said cam face portions facing each other and forming between them a slit, wherein a slug is movable between said cam faces and inserted into said slit to control the movement of said slider and the improvement of a spring connected to said slider and to said shaft carrying a pinion.

2. A preset device for a tuner including a base, a channel switching main shaft rotatably mounted on said base, a rotatably mounted fine adjusting shaft, a rotary drum mounted on said main shaft, a plurality of fine adjusting screws rotatably mounted at the outer periphery of said drum, means to selectively couple said fine adjusting shaft and selectively one of said fine adjusting screws, a plurality of memory slugs each screwed respectively to one of the fine adjusting screws and movable in an axial direction parallel to the axis of the fine adjusting shaft upon the rotation of its fine adjusting screw, a slider movably mounted on said base and cammed by the moving surface of selectively one of the memory slugs, a fine adjusting element connected to said slider and moved when the memory slug cams the slider by the operation of the channel switching main shaft, the improvement of the memory slugs wherein each of said memory slugs has two resilient portions which form a groove between them, said portions being resiliently urged away from each other and each of said portions screw engaging the fine adjusting shaft.

* * * * *

PO-1050
(5/69)

UNITED STATES PATENT OFFICE
CERTIFICATE OF CORRECTION

Patent No. 3,808,896 Dated May 7, 1974

Inventor(s) Shoji Ogasawara and Teruzo Tamate

It is certified that error appears in the above-identified patent and that said Letters Patent are hereby corrected as shown below:

[75] Inventors:
should read:
-- Shoji Ogasawara; Teruzo Tamate, --

Column 1, lines 61-62
should read:
-- mechanism, operates smoothly, has superior durability, has superior fine adjusting function and reproductivity --

Column 3, line 7
should read:
-- 9, the engaging portions a, a of the memory slug 5 are --

Column 3, line 31
should read:
-- ing pressure of the fine adjusting shaft 2 mounted onto --

Signed and sealed this 15th day of October 1974.

(SEAL)
Attest:

McCOY M. GIBSON JR.
Attesting Officer

C. MARSHALL DANN
Commissioner of Patents